(12) United States Patent
Gardt et al.

(10) Patent No.: US 10,882,502 B2
(45) Date of Patent: Jan. 5, 2021

(54) METHOD FOR DETERMINING A CONTROL SIGNAL FOR AN ELECTRONICALLY CONTROLLABLE PRESSURE MEDIUM CONTROL VALVE OF AN ELECTRONICALLY SLIP-CONTROLLABLE POWER BRAKING SYSTEM

(71) Applicant: Robert Bosch GmbH, Stuttgart (DE)

(72) Inventors: Andrej Gardt, Abstatt (DE);
Christoph Eisele, Heilbronn (DE);
Valentin Schubitschew, Tamm (DE);
Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 16/380,377

(22) Filed: Apr. 10, 2019

(65) Prior Publication Data
US 2019/0315328 A1  Oct. 17, 2019

(30) Foreign Application Priority Data
Apr. 12, 2018 (DE) .......................... 10 2018 205 512

(51) Int. Cl.
| | | |
|---|---|---|
| *B60T 13/68* | (2006.01) | |
| *B60T 15/36* | (2006.01) | |
| *F16D 65/28* | (2006.01) | |

(52) U.S. Cl.
CPC .............. *B60T 13/68* (2013.01); *B60T 15/36* (2013.01); *F16D 65/28* (2013.01); *B60T 2201/12* (2013.01)

(58) Field of Classification Search
CPC ...... B60T 13/68; B60T 15/36; B60T 2201/12; F16D 65/28
See application file for complete search history.

(56) References Cited

U.S. PATENT DOCUMENTS

| | | | |
|---|---|---|---|
| 2007/0013230 A1* | 1/2007 | Yang | B60T 8/00 303/152 |
| 2007/0120418 A1* | 5/2007 | Kajita | B60T 8/3275 303/114.1 |
| 2011/0148185 A1* | 6/2011 | Okano | B60T 8/4081 303/6.01 |
| 2012/0161506 A1* | 6/2012 | Tanaka | B60T 8/4081 303/14 |

(Continued)

*Primary Examiner* — Vishal R Sahni
(74) *Attorney, Agent, or Firm* — Norton Rose Fulbright US LLP; Gerard Messina

(57) ABSTRACT

A method is described for determining a control signal for a controllable pressure medium control valve of an electronically slip-controllable power braking system. The underlying power braking system is equipped with an actuating unit including a displaceable actuating element, the displacement of the actuating element determining a throughput of pressure medium through the pressure medium control valve. In the opened state, the pressure medium flowing through the pressure medium control valve causes flow forces on a valve closing element. Under certain circumstances, these flow forces have a closing effect on the valve closing element, thus throttling the possible pressure medium throughput, and cause undesirably high pressure differences in the interior of the pressure medium control valve. To avoid these effects, it is provided that the pressure medium control valve be controlled using a control signal dependent on the speed of an actuation of the actuating element.

7 Claims, 3 Drawing Sheets

(56) References Cited

U.S. PATENT DOCUMENTS

2015/0314686 A1* 11/2015 Knechtges ............ B60T 13/686
　　　　　　　　　　　　　　　　　　　　303/3
2016/0001757 A1* 1/2016 Grangette ............. B60T 13/741
　　　　　　　　　　　　　　　　　　　　303/15

* cited by examiner

METHOD FOR DETERMINING A CONTROL SIGNAL FOR AN ELECTRONICALLY CONTROLLABLE PRESSURE MEDIUM CONTROL VALVE OF AN ELECTRONICALLY SLIP-CONTROLLABLE POWER BRAKING SYSTEM

FIELD OF THE INVENTION

The present invention relates to a method for determining a control signal for an electronically controllable pressure medium control valve of an electronically slip-controllable power braking system.

BACKGROUND INFORMATION

Power braking systems known from the related art are provided with an actuating unit, which is equipped with a displaceable actuating element. The intention to build up a brake pressure and the level of the desired brake pressure in the pressure medium circuits of the power braking system may be predetermined externally by muscle power via a displacement of this actuating element, for example, by a person. With the displacement of the actuating element, pressure medium is displaced from a part of the pressure medium circuit into at least one other part of the pressure medium circuit. The volume of pressure medium to be displaced is dependent on the actuating force and the actuating speed of the actuating element.

Electronically controllable pressure medium control valves are provided in this context to control a flow connection between the two parts of the pressure medium circuit. These pressure medium control valves may have a bidirectional flow-through in the particular opened state, i.e., in two flow directions opposing one another, those skilled in the art refer to this as forward or reverse. Because it is to be ensured that a thermal overload of the pressure medium control valves does not take place in the case of electronic control of the pressure medium control valves and because the pressure medium flowing through results in flow forces having an opening or closing effect as a function of the flow direction through the pressure medium control valve, control signals of different levels are output to the pressure medium control valve by an electronic control unit depending on the flow direction of the pressure medium.

Pressure medium control valves are known to be equipped with actuatable valve closing elements. In addition to the electromechanical actuating forces, flow-dynamic forces are applied to these valve closing elements.

In particular in the case of a high throughput of pressure medium through the pressure medium control valve, the occurring flow forces may load the valve closing elements in the closing direction and thus in opposition to the electromechanical actuating forces acting in the opening direction of the valve closing elements. A high throughput of pressure medium occurs, for example, if the actuation of the actuating element of the pressure medium circuit is abruptly ended by the actuating person. Those skilled in the art refer to this as a rapid brake release.

If the effective flow forces exceed the electromechanical actuating forces, the free flow cross section in the pressure medium control valve is reduced and the pressure medium flow through the pressure medium control valve is throttled. As a result, the pressure medium throughput is reduced and the pressure differences increase in the interior of the pressure medium control valve.

Excessively high pressure differences are undesirable, however, because components of the pressure medium control valve are thus stressed and may be damaged in the extreme case.

SUMMARY

It is provided according to the present invention that a control of the pressure medium control valve be carried out as a function of the throughput of pressure medium to be expected through this pressure medium control valve, to thus avoid undesirably high pressure differences and possibly damage to the pressure medium control valve.

The speed at which an actuation of the actuating element of the pressure medium circuit takes place yields a reliable indication of a high pressure medium throughput to be expected at the pressure medium control valve. This speed is in turn arithmetically derivable by the electronic control unit of the power braking system from the signal of a path sensor, which is provided in any case for measuring an actuating travel of the actuating element. This actuating travel represents one of the main control variables of a power braking system. The electronic control unit ascertains therefrom a control signal for the drive of a pressure generator, which provides a brake pressure correlating with the actuating travel in the pressure medium circuit.

The present invention is accordingly advantageously electronically implementable and does not require additional components, measured variables, or sensors.

Using the provided method, the electronic control of the pressure medium control valve is adapted to the particular demand and at the same time a thermal overload of this pressure medium control valve is avoided.

The provided method is preferably used when the actuating element moves from a deflected or actuation position back into its original starting position, i.e., when, for example, the actuation of the actuating element is withdrawn by the actuating person. A reverse flow-through takes place in the pressure medium control valve, a reverse flow-through being understood to mean that the flow force of the pressure medium is applied to a valve closing element of the pressure medium control valve in its opening direction. This is because it has surprisingly been shown that especially when the flow force has an opening effect, this opening effect decreases with increasing throughput of pressure medium through the pressure medium control valve, i.e., when the flow speed of the pressure medium in the flow cross section increases. This means that when the actuation of the actuating element is withdrawn very rapidly or abruptly, the resulting reversal of the flow force having an opening effect on the valve closing element is compensated for according to the present invention by an increase of the electromechanical actuating force on this valve closing element.

In practice, this means that with increasing speed of a movement of the actuating element, the pressure medium control valve is controlled according to the present invention by the electronic control unit with a current strength which also increases.

In the case of a forward flow-through of the pressure medium control valve, the flow forces generally have a closing effect on the valve closing element and therefore have to be compensated for in any case by correspondingly higher electromechanical actuating forces or via an adapted energization.

DETAILED DESCRIPTION

Figure 1:
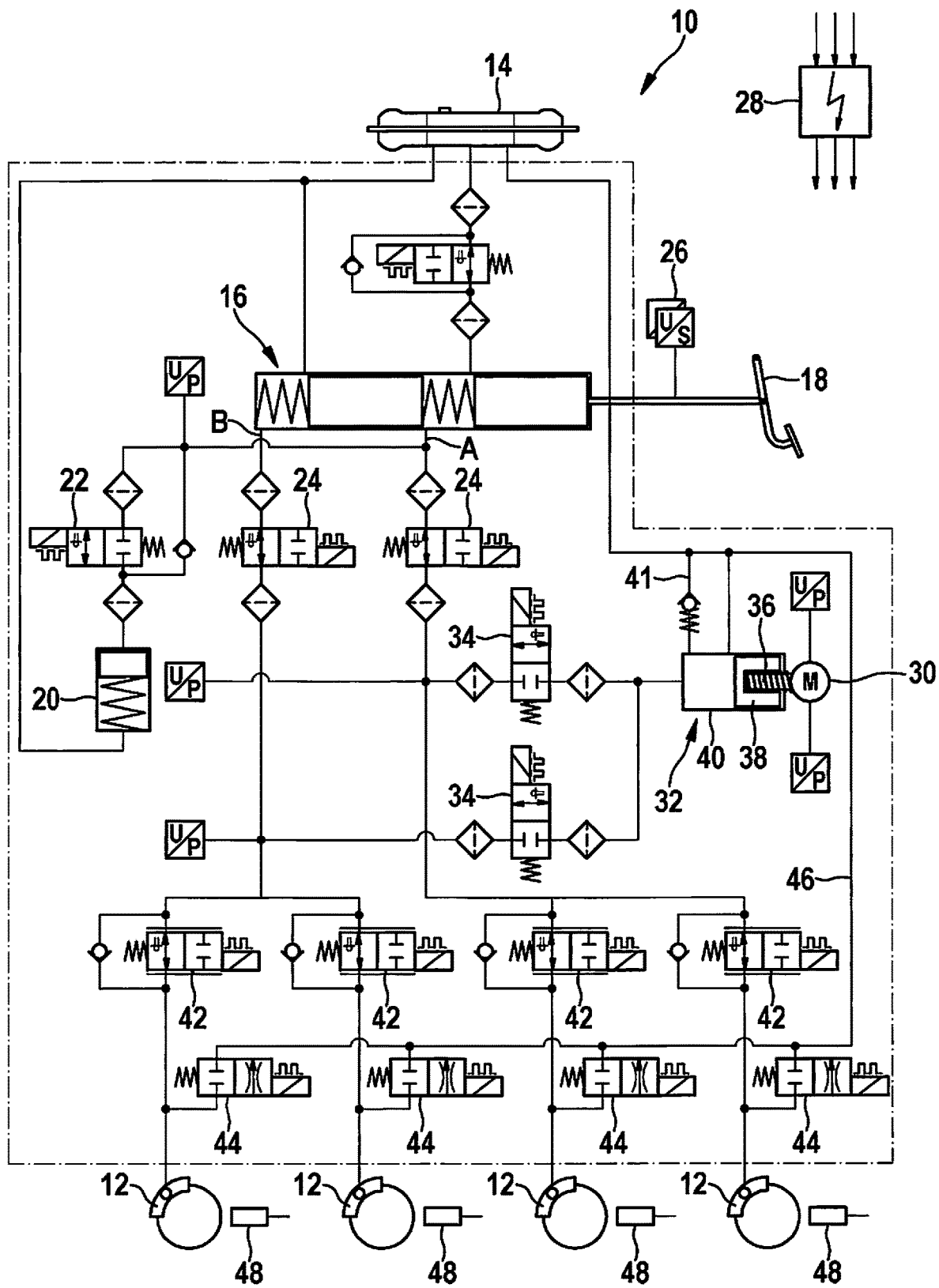
FIG. 1 shows the hydraulic circuit diagram of a slip-controllable power braking system.

Power braking system 10 shown in FIG. 1 is provided for electronic control of the slip conditions on wheels of a motor vehicle equipped with wheel brakes 12. It includes, inter alia, a master brake cylinder 16, which may be actuated by the driver and is supplied with hydraulic pressure medium via a pressure medium reservoir 14, and two brake circuits A, B separate from one another, which are in contact with this master brake cylinder 16 to conduct pressure medium. The driver specifies a braking intention by actuating an actuating element 18 of master brake cylinder 16, by displacing a brake piston in the interior of master brake cylinder 16 against the restoring force of piston springs and displacing pressure medium out of at least one pressure medium chamber, which is delimited by one of the brake pistons. Under normal conditions, i.e., in the proper state of the power braking system, the pressure medium displaced from master brake cylinder 16 arrives in a cylinder/piston system identified as pedal travel simulator 20 and is buffered in a simulator chamber sealed off from a simulator piston. Inflow and outflow of pressure medium in pedal travel simulator 20 are controllable via an electronically controllable simulator control valve 22, which is situated in a line connection between master brake cylinder 16 and pedal travel simulator 20. This is a directional valve having two hydraulic fittings, which may be switched over from a normally closed basic position into an open position by electronic control. Pressure medium flowing out into pedal travel simulator 20 enables an actuating travel of actuating element 18 of master brake cylinder 16.

In order that brake pressure is not built up in brake circuits A; B connected to master brake cylinder 16 in case of an actuation of master brake cylinder 16, circuit separating valves 24 are provided, which interrupt the pressure medium connection of master brake cylinder 16 to brake circuits A; B in the failure-free normal operating state of power braking system 10. These circuit separating valves 24 also have two hydraulic fittings, however, in contrast to simulator control valve 22, they may each be switched over from a normally open basic position into a blocking position.

The actuating travel of actuating element 18 of master brake cylinder 16 is detected with the aid of at least one path sensor 26 and forwarded to an electronic control unit 28 of power braking system 10. This electronic control unit 28 ascertains, from the path signal, a control signal for an electric motor 30 for driving a plunger unit 32, which is connected in parallel to master brake cylinder 16 downstream from circuit separating valves 24 to brake circuits A; B. The hydraulic connection of plunger unit 32 to brake circuits A; B is controllable by plunger control valves 34. These plunger control valves 34 are normally closed like simulator control valve 22 and may each be switched over into an open position by electronic control. They also have two pressure medium fittings.

A gearing 36 is provided between electric motor 30 and plunger unit 32. It converts a rotational movement of electric motor 30 into an axial movement of a plunger piston 38. Plunger piston 38 driven in this manner moves forward in a plunger cylinder 40 (to the left in FIG. 1) and displaces pressure medium stored in plunger cylinder 40 through open plunger control valves 34 into brake circuits A; B. The buildup of a brake pressure takes place in brake circuits A; B, the level of this brake pressure correlating with the actuating travel of actuating element 18 of master brake cylinder 16.

For an adaptation of the brake pressure to the present slip conditions at a wheel of the motor vehicle, a pressure modulation unit, including in each case a pressure buildup valve 42 and a pressure reducing valve 44, is associated with each of the wheels. Pressure buildup valve 42 is a normally open proportional valve, which controls the inflow of pressure medium into a wheel brake 12 of a wheel and thus controls a brake pressure buildup in this wheel brake 12, while pressure reducing valve 44 is designed as a normally closed switchover valve and controls an outflow of pressure medium out of wheel brake 12 back into brake circuits A; B. Pressure medium flowing out of wheel brakes 12 flows via a shared return 46 back into pressure medium reservoir 14 of master brake cylinder 16.

Plunger cylinder 40 is connected to this return 46 via a line connection 41 controlled by a check valve and thus has a pressure-medium-conducting connection to pressure medium reservoir 14. If plunger piston 38 retracts into plunger cylinder 40 due to a corresponding control of electric motor 30, i.e., to the right in FIG. 2, the volume of plunger cylinder 40 increases and pressure medium flows via this line connection 41 out of pressure medium reservoir 14 back into plunger cylinder 40.

The power braking system as shown in FIG. 1 is shown in the functional state and in the non-energized basic position (idle state), i.e., upon a start of a vehicle equipped therewith, the explained valves assume the particular switch positions thereof. In this switch position, simulator control valve 22, plunger control valves 34, and pressure reducing valves 44 are opened, while circuit separating valves 24 and pressure buildup valves 42 are blocked.

If the driver initiates a braking process by actuating actuating element 18 of master brake cylinder 16, pressure medium flows out of master brake cylinder 16 via open pressure medium control valve 22 into pedal travel simulator 20 and actuating element 18 carries out an actuation travel detected by path sensor 26. The signal of path sensor 26 is forwarded to electronic control unit 28 and converted therein into a control signal for electric motor 30 of plunger unit 32. Plunger piston 38 thus driven displaces pressure medium into brake circuits A; B and this pressure medium now enters wheel brakes 12 via pressure buildup valves 42, which are now open. Since pressure reducing valves 44 have been closed simultaneously with opening of pressure buildup valves 42, a brake pressure correlating with the actuation travel of actuating element 18 of master brake cylinder 16 builds up in wheel brakes 12, which decelerates the associated wheel.

The prevailing slip conditions between wheel and roadway determine the brake power transferable from wheel brake 12 and thus the brake pressure still transferable. If wheels threaten to lock up in the case of low slip conditions and/or high brake pressure, pressure buildup valves 42 are closed and pressure reducing valves 44 are opened to reduce the brake pressure prevailing in wheel brakes 12 to a level at which the affected wheel still rolls. The state of a locking wheel is recognized by wheel speed sensors 48 and transmitted to electronic control unit 28 for corresponding adaptation of the control of pressure buildup valve 42 and/or pressure reducing valve 44.

Figure 2:
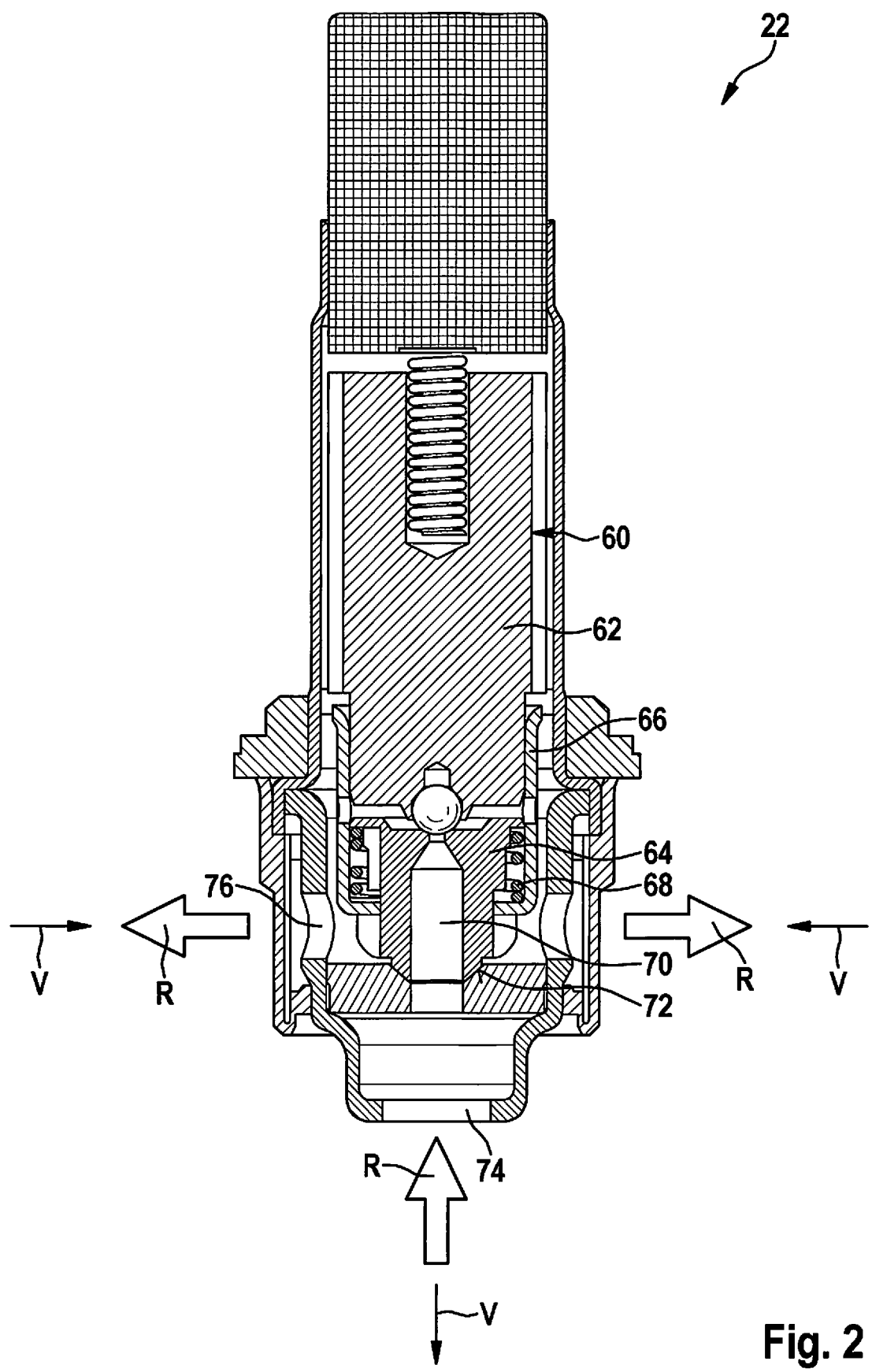
FIG. 2 shows an electronically controllable pressure medium switching valve which may have a bidirectional flow-through in longitudinal section, and FIG. 3 schematically shows the method underlying the present invention on the basis of a flow chart.

FIG. 2 shows pressure medium control valve 22 of power-braking system 10 in longitudinal section. By way of example, this is a bidirectional solenoid valve which may thus have flow-through in two opposing flow directions, and may be switched by electronic control from a normally closed basic position into an open position. The opposing flow directions through pressure medium control valve 22 are illustrated on the basis of various arrow symbols and are identified with reference signs V and R.

Pressure medium control valve 22 has a multistage valve closing element 60 for controlling a valve seat. This is divided into a pilot stage closing element 62 and a main stage closing element 64, where closing elements 62, 64 of the two stages are connected to one another so they are relatively movable with the aid of a coupling sleeve 66 anchored on pilot stage closing element 62. A spring element 68 clamped between coupling sleeve 66 and main stage closing element 64 actuates main stage closing element 64 in the direction of pilot stage closing element 62 in such a way that a pressure equalization bore 70, which is provided in main stage closing element 64 and axially penetrates this main stage element 64, is closed when pressure medium control valve 22 assumes its non-actuated basic position.

In this basic position, main stage closing element 64 blocks a valve seat 72 of pressure medium control valve 22 and thus interrupts a pressure medium connection between a first pressure medium fitting 74 on one end face of pressure medium control valve 22 and a second pressure medium fitting 76 provided on the periphery of pressure medium control valve 22.

Due to the multistage design of valve closing element 60, pressure medium control valve 22 is movable by electronic control from its closed position into an open position even if a pressure difference prevailing at main stage closing element 64 applies a force acting in the closing direction to this main stage closing element 64. This is the case if a higher pressure is applied to peripheral second pressure medium fitting 76 of pressure medium control valve 22 than at frontal first pressure medium fitting 74. However, a higher control signal on pressure medium control valve 22 is necessary for this purpose than if the pressure difference has an opening effect on main stage closing element 64. The latter is the case if a higher pressure prevails on frontal first pressure medium fitting 74 than on peripheral second pressure medium 76.

In the event of an applied pressure difference affecting main stage closing element 64 in the opening direction, a correspondingly lower control signal from electronic control unit 28 to pressure medium control valve 22 is sufficient to switch it from its closed basic position into its open position. The thermal stress of pressure medium control valve 22 may finally thus be reduced.

However, it has been shown under operating conditions of pressure medium control valve 22 that with increasing pressure medium flow on valve seat 72, the effective flow forces are applied to valve closing element 60 in the closing direction and thus against the hydraulic and electromagnetic forces having an opening effect. If the forces having a closing effect become greater than the forces having an opening effect on valve closing element 60, this successively closes the flow cross section and thus throttles the pressure medium flow through pressure medium control valve 22. The components of pressure medium control valve 22 may be mechanically damaged by the resulting pressure difference on valve seat 72 and moreover the pressure medium throughput deteriorates.

The present invention is therefore based on the concept of increasing the actuating forces having an opening effect in such a case by increasing the control signal, to at least compensate for the rising closing forces.

To recognize the state when the pressure medium flow on valve seat 72 has assumed a magnitude at which the explained effect may occur, the signal of path sensor 26 of actuating element 18 of power braking system 10 is used and the speed at which an actuation of actuating element 18 takes place is ascertained from the signal. If the ascertained speed exceeds a threshold value, which may be established in an application-specific manner in the electronic control unit, pressure medium control valve 22 is controlled by electronic control unit 28 using a higher control signal adapted to the ascertained speed.

Figure 3:
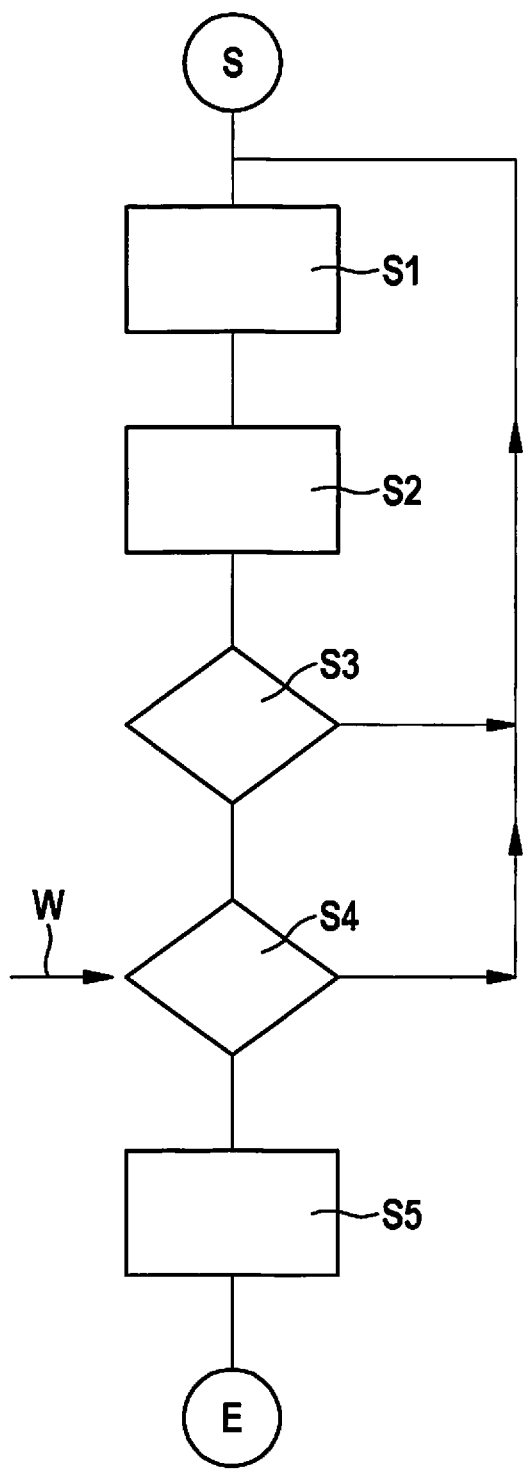

This procedure is shown schematically simplified in the flow chart shown in FIG. 3.

At the beginning of the method, in a first step S1, the curve of the path signal output by path sensor 26 is detected over time in electronic control unit 28. In step S2, the speed and the direction in which an actuation of actuating element 18 of power braking system 10 takes place is ascertained from this signal curve. If it is known from the actuation direction that actuating element 18 moves from a starting position into an actuation position, the method is ended and restarted at a later point in time (step S3). However, if actuating element 18 moves in the opposite direction, i.e., from an actuation position back into the starting position, in step S4, it is checked by electronic control unit 18 whether the ascertained speed of actuating element 18 is greater or less than a threshold value W established in an application-specific manner in control unit 28. If the speed is less than this threshold value, the method is also ended and repeated later. However, if the speed is greater, the control signal applied to pressure medium control valve is increased according to step S5. This increase may be carried out continuously, preferably linearly, as a function of the ascertained speed of actuating element 18, or alternatively in steps, using a freely selectable number of steps. It would also be conceivable to increase the control signal from an original basic value to a maximum value in a single step when it has been established that the limiting speed has been exceeded, using which the pressure medium control valve will be continuously controlled until the speed falls below the limiting speed again.

Of course, modifications or additions to the described exemplary embodiment are conceivable, without deviating from the claimed basic concepts of the present invention.

What is claimed is:

1. A method for determining a control signal for an electronically controllable pressure medium control valve of an electronically slip-controllable power braking system, comprising:
   actuating the power braking system with the aid of a displaceable actuating element;
   detecting, by a sensor unit, an actuating travel of the actuating element over time, wherein the sensor unit forwards the actuating travel to an electronic control unit for brake pressure control of the power braking system;
   ascertaining, by the electronic control unit, a speed at which the actuating element is displaced; and
   controlling the pressure medium control valve by the electronic control unit using a first control signal that is dependent on the ascertained speed of the actuating element, wherein:
   the actuating travel extends between an original starting position and a deflected position of the actuating element, and the first control signal dependent on the speed is output to the pressure medium control valve in response to the actuating element moving from the deflected position back in the direction of the original starting position.

2. The method as recited in claim 1, wherein:
a second control signal that is independent of the speed of the actuating element is output to the pressure medium control valve in response to the actuating element moving from the original starting position in a direction of the deflected position, and.

3. The method as recited in claim 1, further comprising:
outputting, by the electronic control unit, a third control signal adapted to the speed of the actuating element to the pressure medium control valve in response to the ascertained speed of the actuating element exceeding a threshold value stored in the electronic control unit.

4. The method as recited in claim 1, wherein an increase in the third control signal is output to the pressure medium control valve by the electronic control unit with increasing speed of the actuating element.

5. The method as recited in claim 1, wherein a current strength by which the pressure medium control valve is controlled by the electronic control unit is used as the first control signal.

6. The method as recited in claim 1, further comprising:
controlling a pressure medium connection of an actuatable master brake cylinder to a pedal travel simulator of the power braking system using the pressure medium control valve.

7. The method as recited in claim 1, further comprising:
actuating a valve closing element of the pressure medium control valve, the pressure medium control valve having a bidirectional flow-through, wherein:
the valve closing element is switchable from a basic position in which the pressure medium control valve is impenetrable by a pressure medium into another switch position in which the pressure medium control valve is penetrable by the pressure medium.

\* \* \* \* \*